BEST AVAILABLE COPY

TOBIAS NEW. That he needed

Improvement in Water Proof Floors.

No. 4,719. Reissued Jan. 23, 1872.

Witnesses:

Gustave Dietrich

Alex F. Roberts

Inventor:

Tobias New

Per Mm & Co

Attorneys.

UNITED STATES PATENT OFFICE.

TOBIAS NEW, OF NEW YORK, N. Y.

IMPROVEMENT IN WATER-PROOF FLOORS.

Specification forming part of Letters Patent No. 113,787, dated April 18, 1871; reissue No. 4,719, dated January 23, 1872.

Specification describing certain Improvements in Water-Proof Floors, invented by TOBIAS NEW, of the city of New York, in the county and State of New York.

This invention relates to a new and useful improvement in constructing water-proof floors for packing-houses and stables and for all purposes for which said floors are desired; and consists in the construction and arrangement of parts, as hereinafter more fully described.

Figure 1:
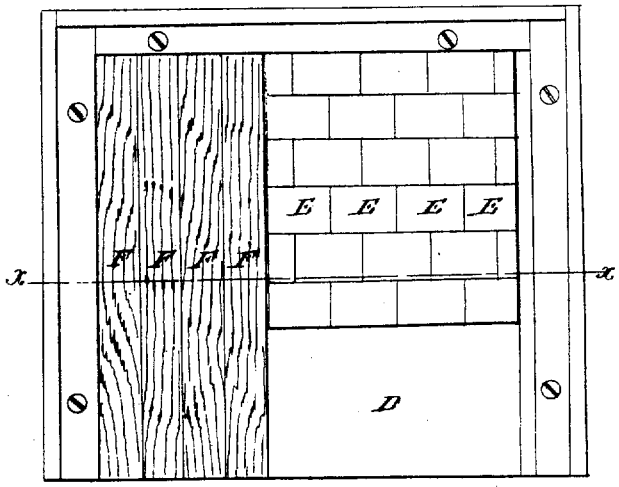
Figure 2:
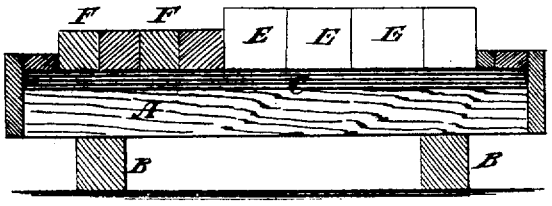

In the accompanying drawing, Figure 1 represents a top view of a piece of floor constructed according to my invention. Fig. 2 is a vertical section of Fig. 1 through the line *x x*.

Similar letters of reference indicate corresponding parts.

A represents the common floor supported on the timbers or joists B in the ordinary manner. This floor I cover with three or more layers of water-proof felting, such as is usually employed for roofing purposes. In this example of my invention I show three layers of water-proof material, of any suitable kind, marked C. This water-proof material I cover with a good coating of hot liquid asphaltum or roofing cement, which is represented by D in Fig. 1. On this coating, and before the asphaltum has become cold or hard, I place paving-blocks made of any suitable material, as seen at E in the drawing; or I place narrow planks on the water-proof lining C, as seen at F. These planks may be of any suitable width or thickness, but not so wide that they cannot be nailed together as they are nailed down or bedded in the asphaltum, as represented in Fig. 2.

I am aware that water-proof floors have been laid in this manner, but the planks have been nailed, through the water-proof lining C, into the floor and floor-timbers, thus partially destroying the water-proof character of the work.

The blocks E do not require nailing, as they are not liable to become displaced.

I do not claim laying planks or boards on a water-proof lining such as I have described; nor do I claim the lining C, as I am aware that it is not new in this connection. I am aware that cement and felt on a wooden base have been applied to slate roofs, and therefore disclaim such a combination as any part of my my invention.

What I do esteem to be my invention, and desire to secure by Letters Patent, is—

The arrangement, upon cement layer D, felt layer C, and base-floor A, of blocks E, made of wood or other material adapted to floors and pavements, as and for the purpose described.

TOBIAS NEW.

Witnesses:
GEO. W. MABEE,
FRANK BLOCKLEY.